United States Patent
Dittrich et al.

(10) Patent No.: US 8,066,606 B2
(45) Date of Patent: Nov. 29, 2011

(54) MULTI-GROUP TRANSMISSION OF A MOTOR VEHICLE

(75) Inventors: Alan Dittrich, Constance (DE); Rayk Hoffmann, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 372 days.

(21) Appl. No.: 12/477,162

(22) Filed: Jun. 3, 2009

(65) Prior Publication Data

US 2009/0305833 A1    Dec. 10, 2009

(30) Foreign Application Priority Data

Jun. 9, 2008    (DE) .......................... 10 2008 002 295

(51) Int. Cl.
- *F16H 37/02* (2006.01)
- *F16H 3/44* (2006.01)
- *F16H 3/08* (2006.01)

(52) U.S. Cl. .......... 475/218; 475/207; 475/302; 74/330; 74/331

(58) Field of Classification Search ............ 74/640, 74/650, 665 R, 664, 330, 331, 335 K, 340, 74/335 B, 720, 325, 333; 475/207, 215, 475/218, 329, 343, 302, 317, 319; 192/48.4, 192/48.5, 3.61
See application file for complete search history.

(56) References Cited

U.S. PATENT DOCUMENTS

| | | | | |
|---|---|---|---|---|
| 3,673,890 A | * | 7/1972 | Crooks ..................... | 475/207 |
| 5,409,426 A | * | 4/1995 | Berthe et al. ............... | 475/118 |
| 5,761,961 A | * | 6/1998 | Krauss et al. ............... | 74/333 |
| 5,823,051 A | * | 10/1998 | Hall, III ..................... | 74/325 |
| 6,244,123 B1 | * | 6/2001 | Hegerath et al. ............ | 74/325 |
| 6,826,974 B2 | * | 12/2004 | Kobayashi .................. | 74/339 |
| 7,021,169 B2 | * | 4/2006 | Kobayashi .................. | 74/333 |
| 7,225,695 B2 | * | 6/2007 | Gumpoltsberger et al. ... | 74/325 |
| 7,472,617 B2 | * | 1/2009 | Nicklass ..................... | 74/340 |
| 2003/0051577 A1 | * | 3/2003 | Hirt ............................ | 74/664 |
| 2008/0254932 A1 | | 10/2008 | Heinzelmann | |
| 2009/0272211 A1 | * | 11/2009 | Hoffmann et al. .......... | 74/325 |
| 2010/0319485 A1 | * | 12/2010 | Miller et al. ................ | 74/664 |

FOREIGN PATENT DOCUMENTS

| | | |
|---|---|---|
| DE | 195 48 622 C1 | 5/1997 |
| DE | 10 2005 046 894 | 9/2005 |
| DE | 10 2007 005 525 | 2/2007 |
| DE | 10 2006 024 370 A1 | 12/2007 |
| WO | 2008095790 | 8/2008 |

\* cited by examiner

*Primary Examiner* — David D Le
*Assistant Examiner* — Michael Gonzalez
(74) *Attorney, Agent, or Firm* — Davis & Bujold, P.L.L.C.

(57) ABSTRACT

A multi-group transmission of a vehicle is arranged in a drivetrain and includes traction force support during gearshift operations. A clutch mechanism, including a frictional clutch and two shifting clutches is arranged between a drive motor with a driveshaft and a transmission input shaft, such that the driveshaft can be connected to the transmission input shaft by one shifting clutch in a first shift position in combination with the frictional clutch or in a second shift position with bridging of the frictional clutch, such that the driveshaft can be directly connected to a main transmission shaft by the other shifting clutch in a shift position in active combination with the frictional clutch. In a method for operating the transmission, the frictional clutch is controlled and operated in combination with the first shifting clutch as a starting clutch and with the second shifting clutch as an intermediate-gear clutch.

17 Claims, 7 Drawing Sheets

MULTI-GROUP TRANSMISSION OF A MOTOR VEHICLE

This application claims priority from German patent application serial no. 10 2008 002 295.0 filed Jun. 9, 2008.

FIELD OF THE INVENTION

The invention concerns a multi-group transmission of a motor vehicle and a method for operating a multi-group transmission of a motor vehicle.

BACKGROUND OF THE INVENTION

Multi-group transmissions consist of two or more transmission groups, usually arranged in series, by combining which a large number of gears can be produced. Increasingly, they are designed as automated gearshift transmissions consisting, for example of an input group, a main group and a downstream range group. Such transmissions are used in particular in utility vehicles since they provide an especially fine gradation of gears, for example with 12 or 16 gears, and are highly efficient. For a smaller number of gears configurations with only a main group and an input group or a main group and a range group are also possible. Furthermore, compared with manual gearshift transmissions they are characterized by high operating comfort and, compared with automatic transmissions, their production and operating costs are particularly economical.

By virtue of their structure conventional multi-group gearshift transmissions, like all manual or automated gearshift transmissions not shifted under load, undergo a traction force interruption during gearshifts since the force flow from the drive motor is always interrupted by disengaging a clutch in order to disengage the engaged gear without load, to synchronize the transmission and the drive motor in a neutral position to a connection speed, and then to engage the target gear. Since the vehicle is rolling during the traction force interruption undesired speed increases or speed decreases can occur. In addition the fuel consumption can increase. Whereas with passenger motor vehicles the traction force interruption, which affects the driving dynamics, is as a rule perceived only as annoying, for example during upshifts in a driving style of sporty orientation, in the case of medium-weight or heavy utility vehicles the driving speed can be reduced to the point where an upshift is made impossible and, on uphill stretches, undesired downshifts, creep-driving or even additional starting operations may be necessary.

From DE 10 2006 024 370 A1 by the present applicant a traction-force-supported automated multi-group transmission is known and has a splitter group as its input transmission, a main group as its basic transmission and a range group as its output or downstream transmission. The structure of this known multi-group transmission with its input group and the main group enables a direct gear to be engaged as an intermediate gear during a gear change. For this, a direct connection is temporarily formed between an input shaft of the input transmission and a main shaft of the main transmission by means of a change-under-load clutch. This renders the main transmission and the splitter group free from load, so that the engaged gear can be disengaged, the transmission synchronized and the target gear engaged. The change-under-load clutch transmits the motor torque to the transmission output, and a dynamic torque that is released during a speed reduction between the original and target gears is used to compensate for the traction force interruption to a large extent. A conventional, separate starting clutch, which can remain engaged during the gearshift operation, maintains the force flow between the drive motor and the input shaft. The change-under-load clutch can be positioned between the input group and the main transmission or between the starting clutch and the input group.

Moreover, from DE 195 48 622 C1 a countershaft gearshift transmission is known, in which a frictional clutch that can be driven by the drive motor, a claw clutch and a synchronous clutch are arranged between a drive motor and a transmission input. The input element of the frictional clutch can be connected by the claw clutch to a transmission input shaft. On the transmission input shaft are mounted fixed wheels of the 1st and 4th gears, which mesh with associated loose wheels on a parallel countershaft. The loose wheels can be connected in a rotationally fixed manner to the countershaft by synchronous clutches. For a 5th gear, conversely, the loose wheel is mounted on the transmission input shaft and the associated fixed wheel on the countershaft.

The output element of the friction clutch can be connected selectively by the synchronous clutch either to the transmission input shaft or to the loose wheel of the 5th gear. In a starting operation the synchronous clutch connects the frictional clutch to the transmission input shaft, from which the torque of the drive motor is transmitted via the gearset of the engaged 1st gear to the drive output of the countershaft.

After starting, the frictional clutch is disengaged and the claw clutch is engaged, i.e. the torque flow changes from the frictional clutch to the claw clutch. For a subsequent gearshift from 1st gear to 2nd gear the synchronous clutch is connected to the loose wheel of the 5th (the highest) gear and the frictional clutch is engaged. This removes load from the gearset of the 1st gear, whereupon the connection of the loose wheel of the 1st gear to the countershaft is released and the loose wheel of the 2nd gear is connected to the countershaft. The frictional clutch is then disengaged again, so that the torque flow is now passed on in 2nd gear via the claw clutch.

This known transmission enables gearshifts to be carried out without interruption of the traction force, and therefore performs the task it is intended for, especially in the starting range when changing from 1st gear to 2nd gear, namely to avoid torque interruptions. However, it is limited to five gears. But multi-group transmissions with 12 or more gears require further measures, not described in the document, in order to enable traction-force-supported shift sequences of the transmission groups.

SUMMARY OF THE INVENTION

Against this background the purpose of the present invention is to indicate a multi-group transmission and a method for operating a multi-group transmission which, with means as simple, inexpensive and space-saving as possible, avoid traction force interruptions during gearshift operations and ensure a high level of shifting comfort.

The invention is based on the recognition that in an automated group transmission, a frictional clutch that can be driven by the drive motor, which in co-operation with shift clutches can act selectively with a drive torque upon either a transmission input shaft or a main transmission shaft, can on the one hand be operated as a starting clutch and, on the other hand, during a gearshift operation, it can also be used as an intermediate-gear clutch to engage a traction-force-supporting direct gear.

Accordingly, the invention starts from a multi-group transmission of a motor vehicle having at least two transmission groups arranged in a drivetrain, in which means for traction force support during gearshift operations are present. To achieve the stated objective the invention also provides that a clutch mechanism comprising a frictional clutch and two shifting clutches is arranged between a drive motor with a driveshaft and a transmission input with a transmission input shaft, such that by means of one of the shifting clutches in a first shift position in active combination with the frictional clutch or in a second shift position in which the frictional clutch is bridged across, the driveshaft can be connected to the transmission input shaft, and such that by means of the other shifting clutch in a further shift position in active combination with the frictional clutch, the driveshaft can be connected directly to a main transmission shaft on the drive output side.

A gearshift is understood to mean a shift operation in which an original gear is disengaged and a target gear is engaged, including also the special case in which the target gear is the same as the original gear so that no gear ratio change takes place. An upstream group is also called a splitter transmission or splitter group (GV), a main group is also called a main transmission or basic transmission (HG) and a downstream group is also called a range transmission or range group (GP). Furthermore, in what follows a frictional clutch will also be called a friction clutch, for short.

In addition the invention starts from a method for operating a multi-group transmission of a motor vehicle, having at least two transmission groups arranged in a drivetrain, in which traction-force-supporting means are activated during a gearshift operation. The stated objective in relation to method is achieved in that a clutch mechanism is arranged between a drive motor with a driveshaft and a transmission input with a transmission input shaft, the mechanism comprising a frictional clutch that can be driven by the drive motor and two shifting clutches, such that the first shifting clutch is connected on its output side to the transmission input shaft and, on its input side, can be shifted optionally between being coupled to the frictional clutch and bridging across the frictional clutch, and the second shifting clutch is connected on its output side to a main transmission shaft on the drive output side and on its input side can be coupled to the frictional clutch, and is controlled in such manner that the frictional clutch acts in co-operation with the first shifting clutch as a starting clutch, and in co-operation with the second shifting clutch, during which the first shifting clutch at the same time bridges across the force flow from the drive motor, as an intermediate-gear clutch for engaging an intermediate gear during a gearshift operation, by means of which a direct force flow connection is formed between the drive motor and the main transmission shaft which is at least actively connected to a transmission output shaft.

Advantageously, by virtue of this intermediate gear engagement the speed loss of the vehicle during any traction shift is significantly reduced and the driving performance is thus improved and the shifting and driving comfort increased. Since the rotating masses to be synchronized can be braked by the intermediate gear the transmission brake usually provided for braking these masses during upshift processes can be omitted, so further costs, structural space and weight are saved or reduced. In addition oscillations and jerky shifts are effectively reduced, since owing to the intermediate gear the drivetrain remains pre-stressed throughout the gearshift operation, whereby an additional increase of the shifting comfort is achieved.

In a preferred embodiment of the invention three automated transmission groups are provided, the first being an upstream group on the transmission input side with a constant near the motor and a constant farther from the motor, the second being a central, main group with at least three gears, and the third being a downstream group on the transmission output side with two gear ranges, these three groups being arranged in the force flow one after another. The upstream group and the main group are made as gear transmissions of countershaft design with at least one common countershaft and the downstream group is made as a planetary transmission.

Preferably, such a transmission is designed with two common countershafts arranged parallel to one another so that the power correspondingly branches via the two countershafts. However, the invention can also be used advantageously with transmissions having only one countershaft, or other group transmissions. Owing to its fine gradation of gears and its high shifting comfort, such a transmission can be used particularly advantageously in utility vehicles.

By means of the constants of the splitter group the gear steps of the main group can be varied. The gears so obtained are then optionally multiplied by a planetary transmission ratio by the range group. Thus, for example in the case of a three-gear basic transmission the number of forward gears obtained is $n=n_{GV} \times n_{HG} \times n_{GP}=2 \times 3 \times 2=12$. Correspondingly, with a four-gear basic transmission 16 forward gears are obtained.

The downstream group mentioned is preferably provided so as to double the number of gears by a range change and thereby make available a comparatively large number of gears. However, it is not strictly necessary for the invention.

The function of such a downstream group of planetary structure in the support of the traction force by an intermediate gear designed as a direct gear is as follows:

In a shift position in which the planetary gears of the range group are locked to the sun gear and the ring gear, so that the range transmission is rotating at the same speed as the main transmission shaft, the intermediate gear is the direct gear of the transmission as a whole. This is also automatically the case when, as can be provided in another embodiment of the invention, the main transmission shaft is connected directly to a transmission output shaft on the transmission output side, i.e. it passes through the range group. Otherwise, however, the intermediate gear corresponds to a direct gear of the gear transmission groups, upon which the ratio of the planetary transmission is imposed. Here it should also be noted that a shift of the range group during a gearshift operation is not traction-force-supported per se. However, the traction force support can be advantageously extended to range shifts by arranging change-under-load means on the range transmission in advance to enable a range change under load. If no downstream group is provided, the main transmission shaft functions at the same time as the transmission output shaft of the transmission as a whole, or it can be integrally connected to a transmission output shaft.

Compared with known traction-force-supported group transmissions with a starting element and an intermediate-gear clutch, the arrangement according to the invention needs only one frictional clutch which, with the help of two shifting clutches used alternatively, can be used both as a starting clutch and also an as intermediate-gear clutch. In accordance with this the shift elements of the constants and of the intermediate gear are in each case engaged or actuated by a shifting clutch. The two shifting clutches can be coupled to the frictional clutch independently of one another.

One shifting clutch can be arranged on the side of the frictional clutch facing toward, or the side facing away from the drive motor. It is made as a synchronous clutch, i.e. a clutch with synchronization. A shift element of this synchronous clutch is connected to the main transmission shaft. At is drive output end the main transmission shaft is connected to a transmission output shaft, either directly or via a range transmission. Thus, the main transmission shaft directly or indirectly forms the drive output shaft via which the motor torque is transmitted to a differential for driving the driven vehicle wheels. The synchronous shifting clutch has a shift position in which, when actuated, it is coupled to the frictional clutch, so that a direct frictional connection between the drive input and drive output, which can be controlled by the frictional clutch, can be formed. Otherwise, it is in a decoupled position such that the main transmission shaft is not directly acted upon by the frictional clutch.

The other shifting clutch is arranged on the side of the frictional clutch facing away from the drive motor. It can be made as an unsynchronized claw clutch or also as a synchronous clutch. A shift element of this shifting clutch is connected to the end of the transmission input shaft nearest the motor. At the end of the transmission input shaft farthest from the motor is arranged a shift element of a shifting device for the alternate engagement of the constants of the splitter group. For its part, the said splitter group shifting device is advantageously made as a synchronous clutch by means of which a respective loose wheel of each constant, mounted to rotate, can alternatively and selectively be connected rotationally fixed to the transmission input shaft.

The synchronous or claw shifting clutch has two shift positions, by which the drive motor can be coupled directly or indirectly to the transmission input. In one shift position it connects the transmission input shaft to the frictional clutch. In turn, in its engaged condition the frictional clutch is connected to the drive motor via a clutch input component of the clutch mechanism. Thus, the force-flow connection of the transmission to the motor can be controlled by means of the frictional clutch, in particular when carrying out a starting process. In its other shift position the shifting clutch connects the transmission input shaft directly to the input component of the clutch mechanism, and thus bridges across the frictional clutch which therefore becomes freely available for controlling an intermediate gear. Between these a neutral, central position is preferably provided, in which the shifting clutch is in neither of the two shift positions.

A particularly simple and compact structure of the arrangement is achieved by making the transmission input shaft as a hollow shaft that encloses the main transmission shaft coaxially. To reduce the structural space even more and save weight and costs, it can be provided that the clutch mechanism comprises a common outer clutch input component which accommodates the frictional clutch and the shifting clutches and which is connected on the motor side to the driveshaft, this clutch input component acting as the drive component for the frictional clutch and optionally for the shifting clutch associated with the transmission input shaft, and further, the frictional clutch acting as the drive component of the shifting clutch associated with the main transmission shaft and optionally for the shifting clutch associated with the transmission input shaft.

The mode of operation of the multi-group transmission according to the invention with intermediate gear engagement is as follows:

For a starting process the frictional clutch is operated as the starting element. For this the frictional clutch is connected, via the associated shifting clutch in a first shift position of the shifting clutch, to the transmission input shift and thus to the constant engaged for starting and the main transmission gear engaged. After starting, the shifting clutch is switched over to a second shift position in which the frictional clutch is bridged across, so that the drive power bypasses the frictional clutch and is transmitted from the clutch input component directly to the transmission input. The frictional clutch is then no longer involved in the force flow between the drive motor and the driven gear, and can be disengaged without interrupting the traction force of the vehicle.

During a gearshift the frictional clutch is now available for engaging an intermediate gear and for adapting the speed of the drive motor for a selected target gear. For this, the frictional clutch is connected directly to the main transmission shaft and thus to the transmission output via the second shifting clutch in a shift position of the shifting clutch. Thus, the torque flow for traction force support is transmitted by a direct connection of the drive input to the main transmission shaft. This renders the main transmission free from load and therefore able to be shifted, i.e. the gear engaged at the time can be disengaged and the main transmission shifted to its neutral position while the intermediate gear engaged as a direct gear maintains the positive drive of the vehicle.

The frictional clutch, now functioning as the intermediate-gear clutch and operated in slipping mode, transmits the torque of the drive motor to the main transmission shaft on the drive output side, while the speed of the drive motor is adapted to a synchronous speed of the target gear. When the synchronous speed has been reached the target gear can be engaged and then the frictional clutch is disengaged again, so opening the intermediate gear. The bridging of the frictional clutch by the first shifting clutch remains in place throughout the gearshift process.

All traction-force-relevant gearshifts can in this way be carried out advantageously with engaged shifting clutches, i.e. with the frictional clutch bridged between the driveshaft and the transmission input shaft and with the main transmission shaft connected to the frictional clutch, such that the direct gear engaged as an intermediate gear is engaged with the frictional clutch in controlled slipping operation. In principle traction-force-supported intervals covering more than a single gear step can also be shifted through, which is of advantage particularly in the case of finely gradated utility vehicle transmissions during driving and maneuvering operations.

BRIEF DESCRIPTION OF THE DRAWINGS

To clarify the invention the description of a drawing with two example embodiments is attached. The drawing shows.

DETAILED DESCRIPTION OF THE PREFERRED EMBODIMENTS

Figure 1:
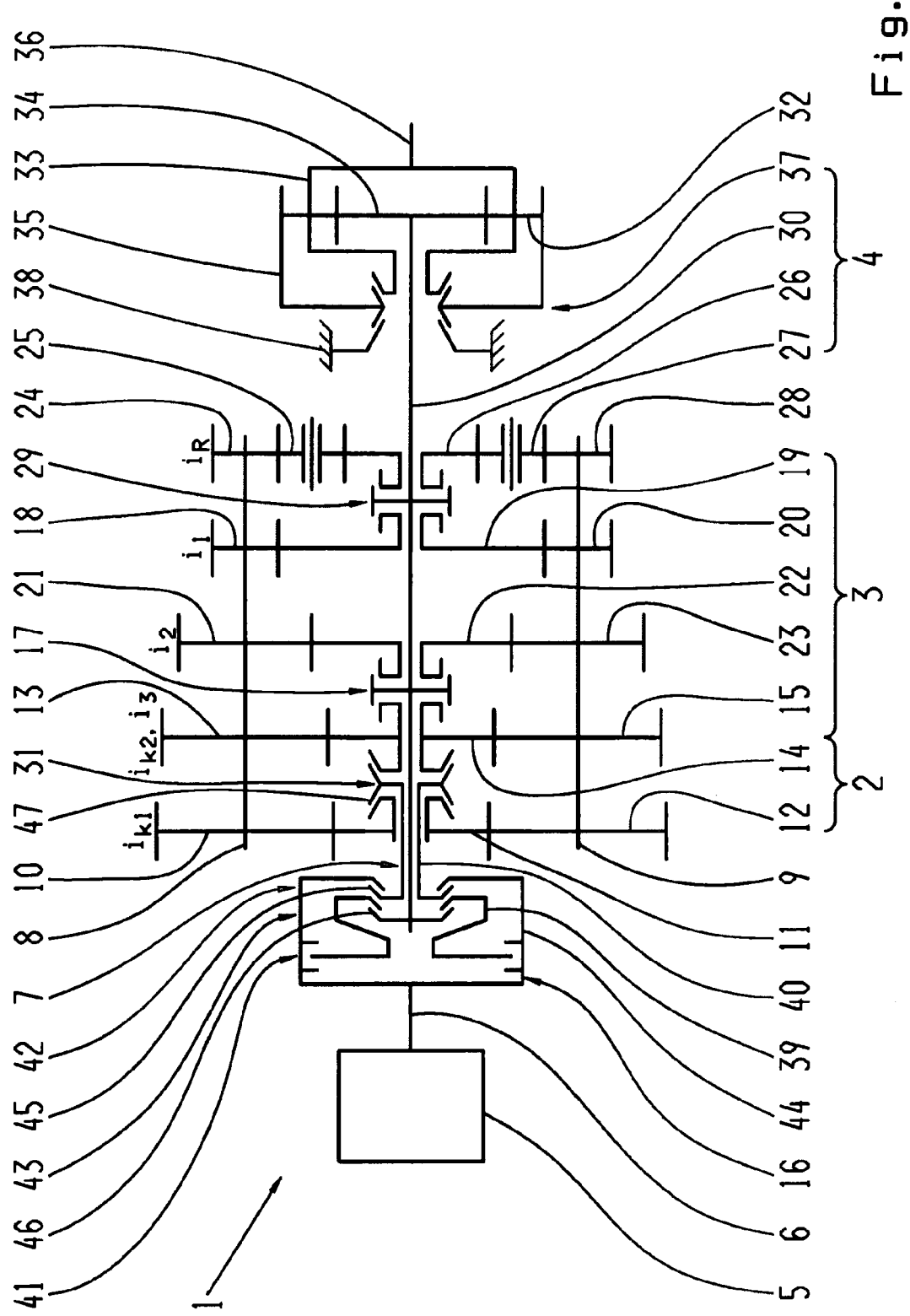
FIG. 1: A diagrammatic view of an automated multi-group transmission of a motor vehicle with a clutch mechanism on the drive input side, which comprises a frictional clutch and two synchronized shifting clutches.

FIG. 1 shows an automated multi-group transmission which is made as a two-countershaft transmission 1 with two rotating countershafts 8, 9 mounted parallel to one another and three transmission groups 2, 3 and 4 arranged one after another, as can be provided for example in the drivetrain of a utility vehicle. Such a transmission per se, i.e. without traction force support, is known from the ZF-AS Tronic series produced by the present applicant, and with traction force support, from DE 10 2006 024 370 A1 by the present applicant, mentioned at the start.

The first transmission group 2, arranged on the motor side, is made as a two-gear splitter transmission. The second, central transmission group 3 is formed by a three-gear main or basic transmission. As the third transmission group 4 on the drive output side is arranged a downstream, two-gear range group.

The splitter group 2 has two constants $i_{k1}$, $i_{k2}$, respectively comprising fixed wheels 10, 12 and 13, 15 arranged in a rotationally fixed manner on the first countershaft 8 and on the second countershaft 9, which mesh with a respective loose wheel 11 or 14. The first constant $i_{k1}$ is arranged facing a drive motor 5 and the second constant $i_{k2}$ facing the main transmission 3. To engage the constants $i_{k1}$, $i_{k2}$ of the splitter transmission 2 a shifting device 31 with synchronization is provided, by means of which, selectively and alternately, the loose wheels 11 or 14 can be connected in a rotationally fixed manner to a transmission input shaft 40. The transmission input shaft 40 is made as a hollow shaft through which an inner, central main transmission shaft 30 passes coaxially.

The main transmission 3 has three forward-gear gearsets $i_1$, $i_2$ and $i_3$ and a reverse-gear gearset $i_R$. The 1st main transmission gear $i_1$, and the 2nd main transmission gear $i_2$ respectively comprise two fixed wheels 18, 20 and 21, 23 and a loose wheel 19 and 22. The 3rd main transmission gear $i_3$ is produced in combination with the second constant $i_{k2}$ of the splitter group 2. The reverse-gear gearset $i_R$ comprises two fixed wheel 24, 28, a loose wheel 26 and two freely rotating intermediate wheels 25, 27 for reversing the rotation direction, which mesh on one side with the respectively associated fixed wheels 24 or 28 and on the other side with the loose wheel 26.

To engage the 1st main transmission group $i_1$, and the reverse-gear gearset $i_R$ an unsynchronized claw-type shifting device 29 is provided, by means of which the associated loose wheels 19 or 26 can selectively be connected in a rotationally fixed manner to the central, main transmission shaft 30. The 2nd and 3rd main transmission gears $i_2$ and $i_3$ are engaged by means of another claw shifting device 17, by which the associated loose wheels 22 or 14 can selectively be connected in a rotationally fixed manner to the main transmission shaft 30.

The downstream range group 4 is made as a planetary transmission. It comprises a planetary gearset 32 with a plurality of not explicitly illustrated planetary gears which are guided by a planetary gear carrier 33. The planetary gears mesh on one side with a central, sun gear 34 and on the other side with an outer, ring gear 35. The sun gear 34 is connected to the output-side end of the main transmission shaft 30. The planetary gear carrier 33 is connected to a transmission output shaft 36.

To shift the range group 4 a shifting device 37, advantageously with synchronization, is provided. In a first shift position this shifting device 37 connects the ring gear 35 to a housing 38, so that the planetary gears rotate between the ring gear 35 and the sun gear 34 and the transmission output shaft 36 is driven by the planetary gear carrier 33 in the same direction as the main transmission shaft 30 but with the gear ratio concerned. In a second shift position the ring gear 35 is locked to the planetary gear carrier 33 so that the planetary transmission 4 and thus the transmission output shaft 36 rotate directly at the same speed as the main transmission shaft 30.

According to the invention, between the drive motor 5 and a transmission input 7 is arranged a clutch mechanism 16 comprising a frictional clutch 41 and two shifting clutches 42, 43 made as synchronous clutches. The clutch mechanism 16 comprises a clutch input component 44 in the form of a hollow cylinder, which can be driven by the drive motor 5 via a driveshaft 6. This input component 44 encloses the three clutches 41, 42 and 43. On its inside are arranged friction partners, which correspond with friction partners of the frictional clutch 41 and co-operate with them when necessary.

One synchronous clutch 42, the one closest to the first constant $i_{k1}$ comprises a shift element 45 connected in a rotationally fixed manner to the end of the transmission input shaft 40 on the motor side, which can be connected optionally to the frictional clutch 41 or to the clutch input component 44. Accordingly, the force flow between the drive motor 5 and the transmission input shaft 40 can be switched between the friction clutch connection and the clutch input component connection.

At the end of the transmission input shaft 40 on the transmission side is arranged, in a rotationally fixed manner, a shift element 47 of the shifting device 31 of the splitter group 2. Thus, the shift element 45 of the synchronous clutch 42 and the shift element 47 of the shifting device 31 of the splitter group 2 are connected in a rotationally fixed manner with one another via the transmission input shaft 40.

The other synchronous clutch 43, nearest the frictional clutch 41, is designed to form an optional frictional connection between the drive motor 5 and the main transmission shaft 30. Its shift element 46 is arranged in a rotationally fixed manner on the end of the main transmission shaft 30 on the motor side, and can be coupled to the frictional clutch 41.

To couple the frictional clutch 41 to the synchronous clutches 42, 43, a coupling component 39 facing toward the transmission input 7 is formed on the frictional clutch 41, which engages between the shift element 45 of one synchronous clutch 42 and the shift element 46 of the other synchronous clutch 43.

Figure 4:
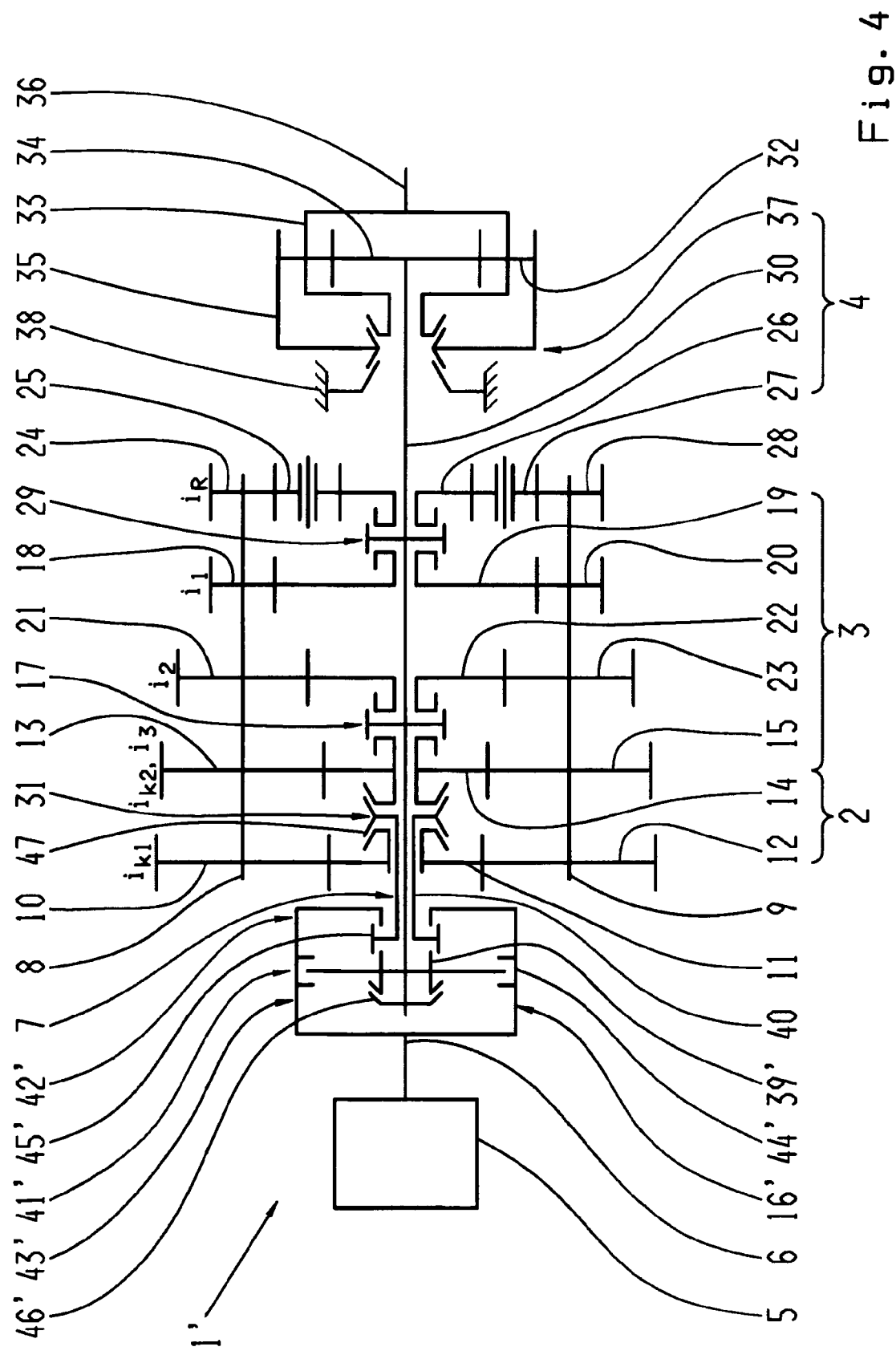
FIG. 4: A diagrammatic view of second embodiment of an automated multi-group transmission of a motor vehicle with a clutch mechanism on the drive input side, which comprises a frictional clutch, a synchronized shifting clutch and a claw-type shifting clutch.

FIG. 4 shows another two-countershaft transmission 1' with a clutch mechanism 16'. The clutch mechanism 16' comprises a frictional clutch 41' and two shifting clutches 42', 43'. The first shifting clutch 42', oriented toward the first constant $i_{k1}$, is made as a claw clutch. It comprises a shift element 45' connected rotationally fixed to one end of the transmission input shaft 40, which can selectively be connected to the frictional clutch 41' or to a clutch input component 44'.

The claw clutch 42' optionally forms a friction connection between the drive motor 5 and the transmission input shaft 40 via the frictional clutch 41', or an interlocked connection between the drive motor 5 and the transmission input shaft 40 directly by means of the clutch input component 44'.

The other switching clutch 43' is made as a synchronous clutch, which is arranged on the side of the frictional clutch 41' facing toward the motor 5. Its shift element 46' is arranged rotationally fixed on the end of the main transmission shaft 30 nearest the motor and can be coupled to the frictional clutch 41'. To couple the frictional clutch 41' to the shifting clutches 42', 43' a two-sided coupling component 39' is formed on the frictional clutch 41', which can be connected on one side to the shift element 45' of the claw clutch 42' and on the other side to the shift element 46 of the synchronous clutch 43'. In other respects the transmission 1' corresponds to the transmission 1 according to FIG. 1.

From the combination of the transmission groups 2, 3 and 4 of the transmission layouts 1 or 1' shown, a total of n=2× 3×2=12 gears are obtained. The force flow branches in accordance with a shift sequence in which, starting with the 1st gear in the main transmission 3, first the splitter group 2 and the main group 3 are shifted through in alternation so that 2×3=6 gears of a lower gear range. "1st gear to 6th gear" are engaged in succession. When the 6th gear is reached, the range group 4 is changed over and the main group 3 and the splitter group 2 are again shifted through in alternation, so that once more 2×3=6 gears are engaged, but this time in an upper gear range "7th gear to 12th gear". In addition the splitter group 2 also engages the reverse gear ratio $i_R$ in alternation, so that two reverse gears are available.

A method according to the invention for operating a multi-group transmission 1, 1' of a motor vehicle consists essentially in that a frictional clutch 41, 41' in co-operation with a first and/or a second shifting clutch 42, 42; and 43, 43', is controlled and operating as a starting clutch for starting operations and as an intermediate-gear clutch during gearshift operations.

Figure 2:
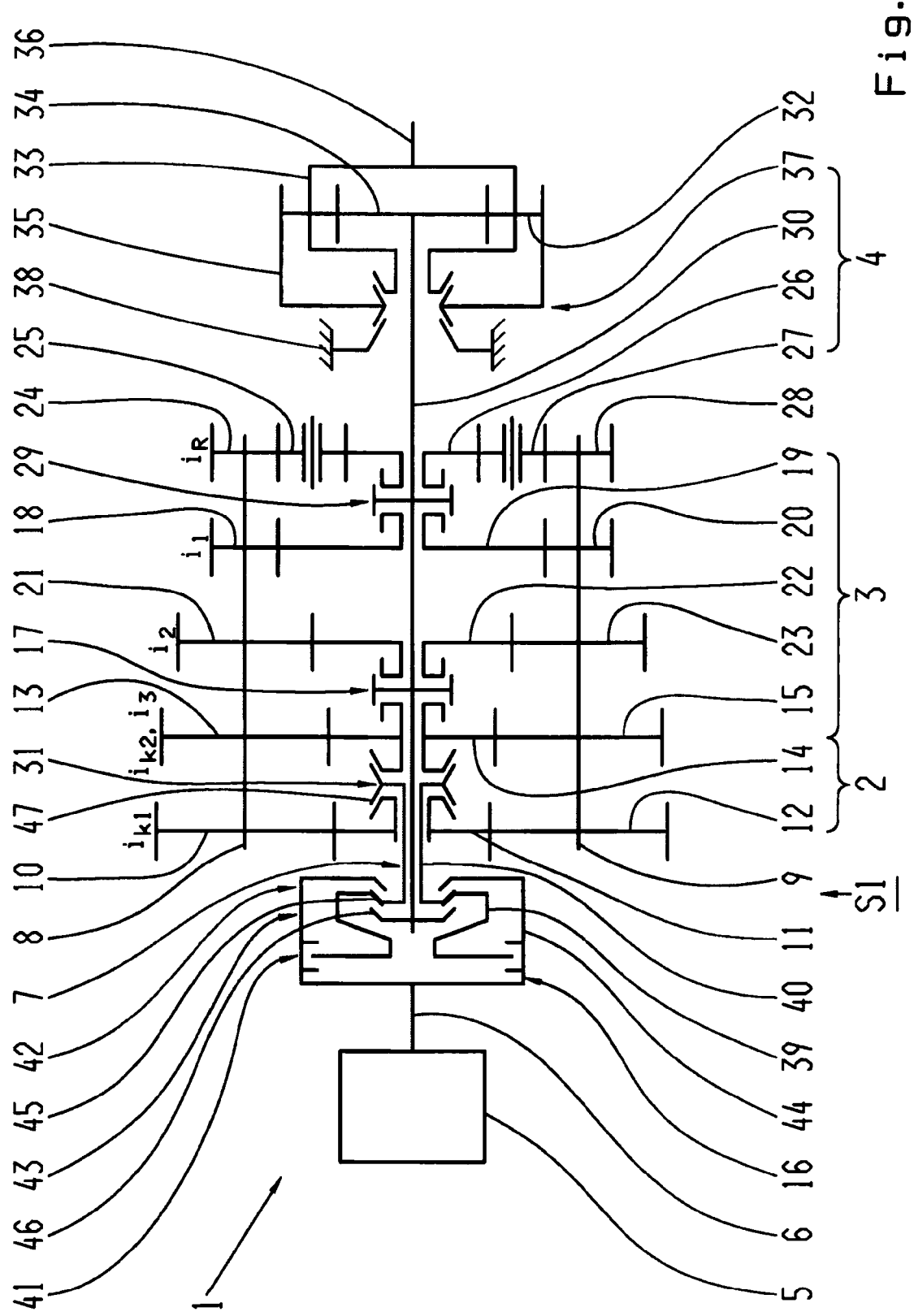
FIG. 2: The diagrammatic view of FIG. 1 with a shifting clutch position in which the starting gear is engaged.
Figure 5:
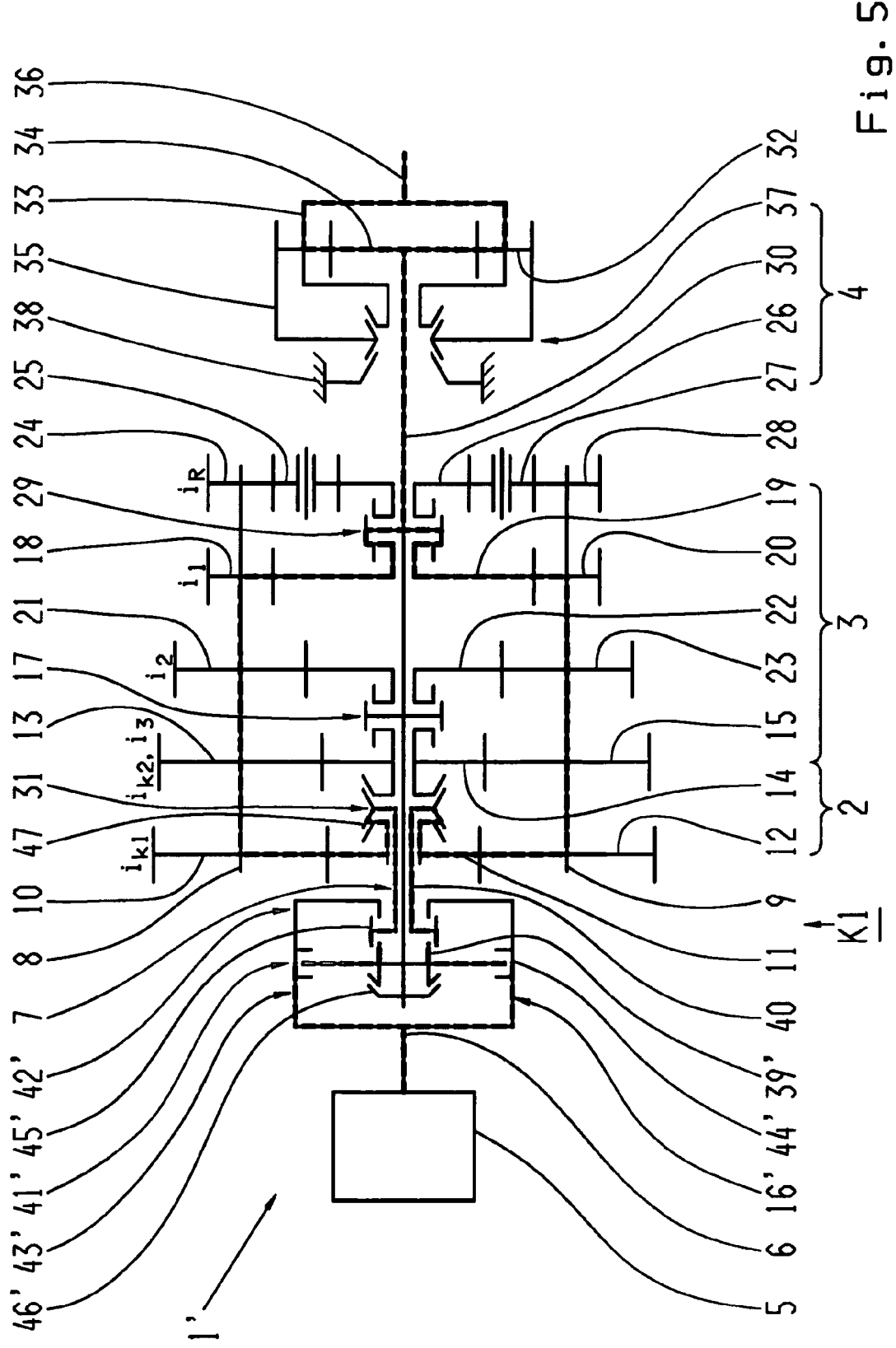
FIG. 5: The diagrammatic view of FIG. 4 with the torque flow in the starting gear indicated.
Figure 6:
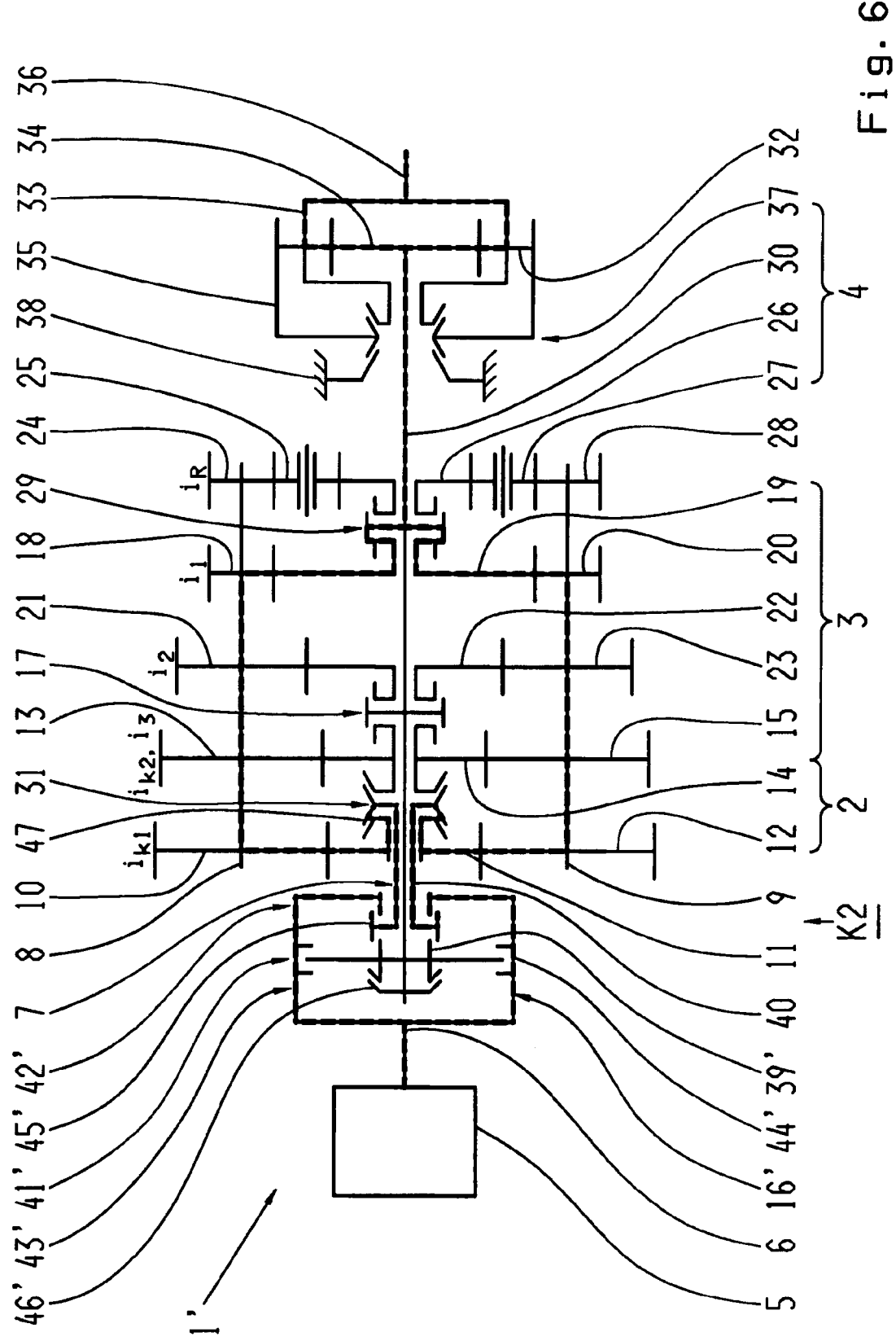
FIG. 6: The diagrammatic view of FIG. 4 with the torque flow during driving operation indicated.

The method is explained in more detail with reference to shift positions of the above described transmissions 1 or 1' shown in FIGS. 2 and 3 or in FIGS. 5 to 7 respectively. For the sake of clarity the shift position in each case is mentioned separately and, in part, an associated torque flow is shown, emphasized by broken lines.

For starting, the frictional clutch 41 or 41' is connected to the transmission input shaft 40 via the shifting device 31 of the splitter group 2, i.e. depending on the embodiment concerned, via the shift element 45 of the synchronous clutch 42 or via the shift element 45' of the claw clutch 42'. FIG. 2 shows the related shift position S1 of the synchronous clutch. In FIG. 5 a corresponding shift position K1 of the claw clutch 42 is indicated by the torque flow for the starting process. Here the starting gear is the 1st gear, i.e. the drive torque coming from the driveshaft 6 passes via the frictional clutch 41 or 41' and the first constant $i_{K1}$, and on via the countershafts 8, 9, and the drive output passes via the 1st main transmission gear $i_1$, to the main transmission shaft 30 and via the range group 4 in its lower gear range to the transmission output shaft 36.

After starting, the clutch input component 44 or 44' is connected to the transmission input shaft 40 by the shift element 45 of the synchronous clutch 42 or by the shift element 45' of the claw clutch 42', so that the frictional clutch 41 or 41' is bridged across and can be disengaged. The torque flow during normal driving operation with the frictional clutch 41 bridged, and the associated shift position K2 of the claw clutch 42', is shown in FIG. 6.

Figure 3:
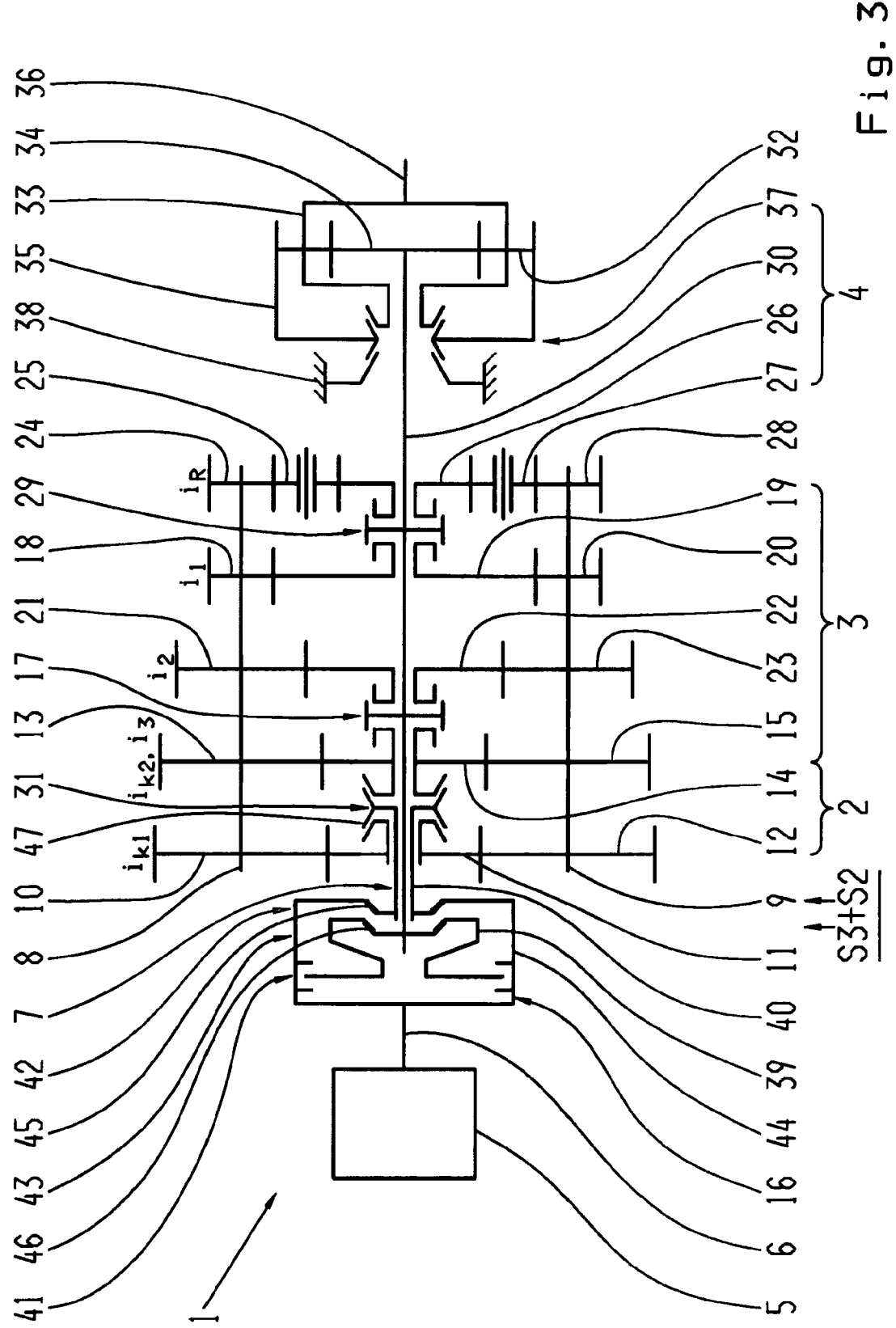
FIG. 3: The diagrammatic view of FIG. 1 with a shifting clutch position in which the intermediate gear is engaged and the frictional clutch is bridged.

FIG. 3 shows the corresponding shift position S2 of the synchronous clutch 42. In addition, however, in this case a direct gear is engaged as necessary to provide the intermediate gear during a gearshift operation for the traction force support of the gearshift. For this, the shift element 46 or 46' of the synchronous clutch 43 or 43' of the intermediate gear is connected to the frictional clutch 41 or 41', so that a direct connection is formed as the intermediate gear between the driveshaft 6 and the main transmission shaft 30 or the transmission output shaft 36.

Thanks to the intermediate gear engaged with a slipping frictional clutch for adapting the speed to a target gear, the main transmission 3 is rendered free from load so that the original gear can be disengaged. When the synchronous speed of the next gear has been reached, the target gear can be engaged. During this the synchronous clutch 42 or claw clutch 42', respectively in its bridging position S2 or K2, remains closed. This is the situation represented in FIG. 3, in which the frictional clutch 41 is bridged in the shift position S2 while at the same time the intermediate gear is engaged since the synchronous clutch 43 is in the shift position S3. Once the gearshift has taken place the frictional clutch 41, 41' is disengaged again, i.e. the intermediate gear is released.

Figure 7:
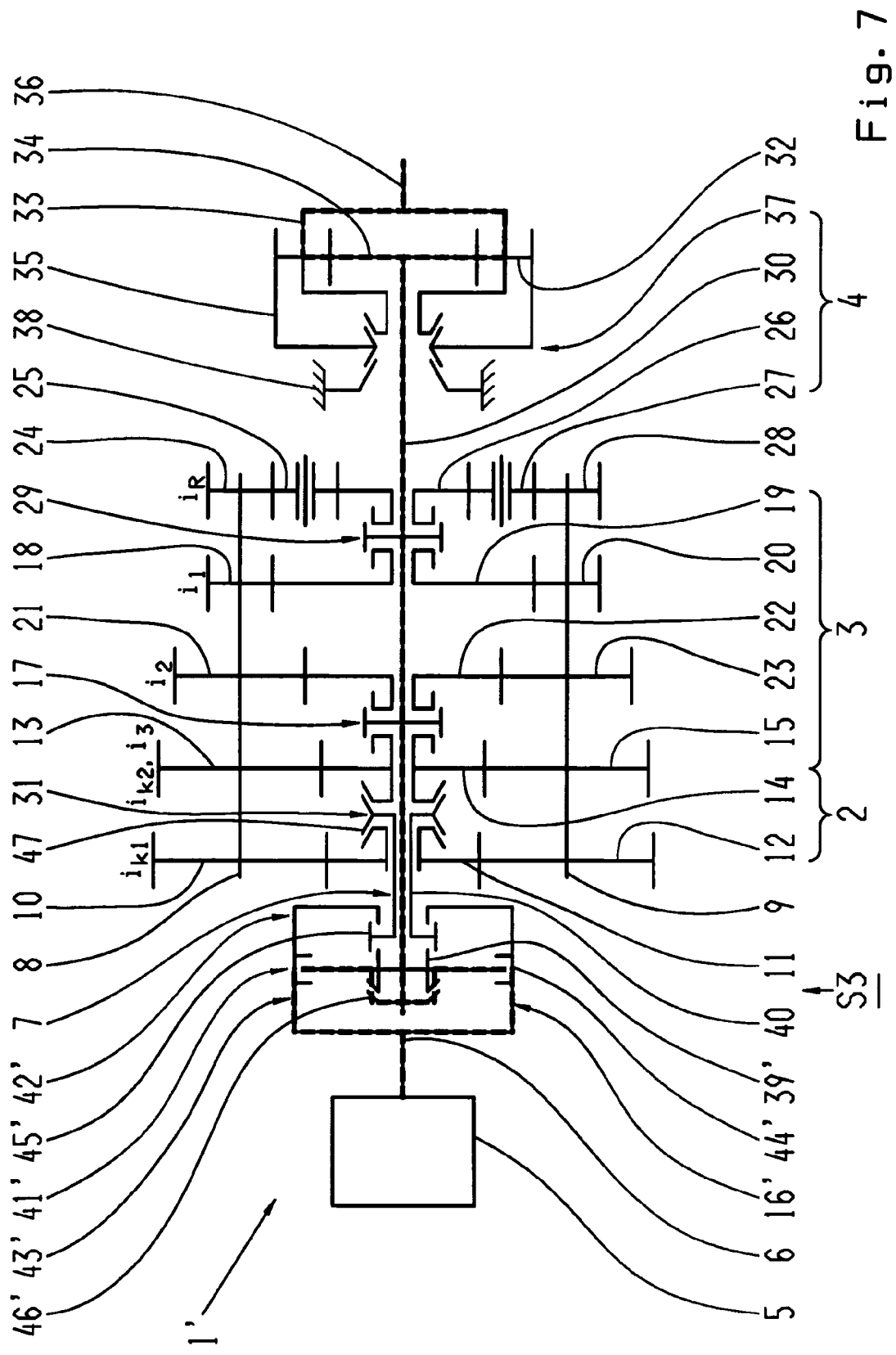
FIG. 7: The diagrammatic view of FIG. 4 with the torque flow in the intermediate gear indicated.

FIG. 7 illustrates the torque flow of the intermediate gear designed as a direct gear in shift position S3 of the synchronous clutch 43'. The motor torque is transmitted from the driveshaft 6, via the frictional clutch 41' in slipping operation, directly to the main transmission shaft 30, from which it is passed on to the transmission output shaft 36 via the range group 4 in its upper gear range, i.e. with the planetary gears locked.

All traction-force-relevant shifts, i.e. traction shifts after the starting process, can take place with the frictional clutch 41, 41' between the driveshaft 6 and the transmission input shaft 40 bridged, i.e. in the respective shift positions S2 or K2 of the engaged synchronous clutch 42 or claw clutch 42', with traction force support by the intermediate gear while the intermediate-gear synchronous clutch 43 or 43' is engaged.

Conventional shift operations with traction force interruption can be carried out with the starting clutch 41, 41' when the synchronous clutch 42 or the claw clutch 42' is engaged in their respective shift position S1 or K1 and while the intermediate-gear synchronous clutch 43 or 43' is engaged.

LIST OF INDEXES 1, 1' Two-countershaft transmission
2 Upstream group, splitter transmission
3 Main group, main transmission
4 Downstream group, range transmission
5 Drive motor
6 Driveshaft
7 Transmission input
8 Countershaft
9 Countershaft
10 Fixed wheel
11 Loose wheel
12 Fixed wheel
13 Fixed wheel
14 Loose wheel
15 Fixed wheel
16, 16' Clutch mechanism
17 Shift device
18 Fixed wheel
19 Loose wheel
20 Fixed wheel
21 Fixed wheel
22 Loose wheel
23 Fixed wheel
24 Fixed wheel
25 Intermediate wheel
26 Loose wheel
27 Intermediate wheel
28 Fixed wheel
29 Shift device
30 Main transmission shaft
31 Shift device
32 Planetary gearset
33 Planetary gear carrier
34 Sun gear
35 Ring gear
36 Transmission output shaft
37 Shift device
38 Housing
39, 39' Coupling component 40 Transmission input shaft
41, 41' Friction clutch, starting clutch, intermediate-gear clutch
42, 42' Shifting clutch
43, 43' Shifting clutch
44, 44' Clutch input component
45, 45' Shift element
46, 46' Shift element
47 Shift element
$i_{k1}$ Splitter transmission constant
$i_{k2}$ Splitter transmission constant
$i_1$ Main transmission gear
$i_2$ Main transmission gear
$i_3$ Main transmission gear
$i_R$ Main transmission reverse gear
K1 Shift position
K2 Shift position
S1 Shift position
S2 Shift position
S3 Shift position

The invention claimed is:

1. A multi-group transmission of a motor vehicle, with at least two transmission groups (2, 3) arranged in a drivetrain and a means for supporting traction force during gearshift operations, the multi-group transmission comprising:
a clutch mechanism (16, 16') arranged between a drive motor (5), having a driveshaft (6), and a transmission input (7), having a transmission input shaft (40), a frictional clutch (41, 41') and first and second shifting clutches (42, 42', 43, 43'),
the driveshaft (6) being connectable to the transmission input shaft (40) by a first shifting clutch (42, 42') in either a first shift position (S1, K1) in active combination with the frictional clutch (41, 41'), or a second shift position (S2, K2) with bridging of the frictional clutch (41, 41'), and
the driveshaft (6) being directly connectable to a main transmission shaft (30) on a drive output side by a second shifting clutch (43, 43') in active combination with the frictional clutch (41, 41).

2. The multi-group transmission according to claim 1, wherein the first shifting clutch (42'), which is associated with the transmission input shaft (40), is a claw clutch and the second shifting clutch (43, 43'), which is associated with the main transmission shaft (30), is a synchronous clutch.

3. The multi-group transmission according to claim 1, wherein both of the first and the second shifting clutches (42, 43, 43') are synchronous clutches.

4. The multi-group transmission according to claim 1, wherein the clutch mechanism (16, 16') comprises an outer clutch input component (44, 44') that accommodates the frictional clutch (41, 41') and the first and the second shifting clutches (42, 42', 43, 43') and is connected on a motor side to the driveshaft (6), such that the outer clutch input component (44, 44') is a driving component for the frictional clutch (41, 41') and optionally the first shifting clutch (42, 42'), associated with the transmission input shaft (40), and the frictional clutch (41, 41') acts as a driving component for the second shifting clutch (43, 43'), associated with the main transmission shaft (30), and optionally for the first shifting clutch (42, 42') associated with the transmission input shaft (40).

5. The multi-group transmission according to claim 1, wherein the second shifting clutch (43'), associated with the main transmission shaft (30), is arranged on a side of the frictional clutch (41') facing toward the drive motor (5), and the first shifting clutch (42), associated with the transmission input shaft (40), is arranged on a side of the frictional clutch (41') facing away from the drive motor (5).

6. The multi-group transmission according to claim 1, wherein both of the first and the second shifting clutches (42, 43) are arranged on a side of the frictional clutch (41) facing away from the drive motor (5).

7. The multi-group transmission according to claim 1, wherein the transmission input shaft (40) is a hollow shaft which coaxially encloses the main transmission shaft (30).

8. The multi-group transmission according to claim 1, wherein the transmission input shaft (40) is connected, at an end nearest the motor, to a shift element (45, 45') of the first shifting clutch (42, 42') and, at an end remote from the motor, to a shift element (47) of a shifting device (31) for alternate engagement of constants ($i_{k1}$, $i_{k2}$) of a splitter group (2).

9. The multi-group transmission according to claim 8, wherein the shifting device (31) of the splitter group (2) is a synchronous clutch by which a respective rotating loose wheel (11, 14) of the constants ($i_{k1}$, $i_{k2}$) are selectively and alternately connected, in a rotationally fixed manner, to the transmission input shaft (40).

10. The multi-group transmission according to claim 1, wherein the multi-group transmission comprises a splitter group (2), a central, main group and a range group (4), the splitter group (2) has a gear constant near the motor on a transmission input shaft and a gear constant remote from the motor ($i_{k1}$, $i_{k2}$), the central, main group (3) has at least three gears ($i_1$, $i_2$, $i_3$), and the range group (4), on a transmission output side, has two gear ranges, the three automated transmission groups (2, 3, 4) are sequentially arranged one after another in a flow power, and the splitter group (2) and the main group (3) are gear transmissions of countershaft design with at least one common countershaft (8, 9) and the range group (4) is a planetary transmission.

11. The multi-group transmission according to claim 1, wherein the main transmission shaft (30) is actively connected to a transmission output shaft (36) by a range group (4).

12. The multi-group transmission according to claim 1, wherein the main transmission shaft (30) is connected directly to a transmission output shaft.

13. The multi-group transmission according to claim 1, wherein a range group (4) comprises a change-under-load means for shifting between gear ranges without interrupting a traction force.

14. A method of operating a multi-group transmission of a motor vehicle having at least two transmission groups (2, 3) arranged in a drivetrain, in which traction-force-supporting means are activated during a gearshift operation, wherein a clutch mechanism (16, 16') is arranged between a drive motor (5) with a driveshaft (6) and a transmission input (7) with a transmission input shaft (40), the clutch mechanism (16, 16') comprising a frictional clutch (41, 41'), which is driven by the drive motor (5), and first and second shifting clutches (42, 42', 43, 43'), the first shifting clutch (42, 42') is connected on an output side to the transmission input shaft (40) and, on an input side, is alternatively shiftable between being coupled to the frictional clutch (41, 41') and bridging the frictional clutch (41, 41'), and the second shifting clutch (43, 43') is connected on an output side to a main transmission shaft (30) on the drive output side and, on an input side, is connectable to the frictional clutch (41, 41'), the method comprising the steps of:
controlling the clutch mechanism such that the frictional clutch (41, 41'), in co-operation with the first shifting clutch (41, 42'), functions as a starting clutch;
controlling the clutch mechanism such that the frictional clutch (41, 41'), in co-operation with the second shifting clutch (43, 43') and with the first shifting clutch (42, 42'), simultaneously bridges the friction clutch (41, 41') in a force flow from the drive motor (5), functions as an intermediate-gear clutch for engaging an intermediate gear during a gearshift operation, such that a direct force-flow connection is formed between the drive motor (5) and the main transmission shaft (30) which is at least actively connected to a transmission output shaft (36).

15. The method according to claim 14, further comprising the step of operating the frictional clutch (41, 41'), which is functioning as the intermediate-gear clutch, in a slipping condition when an intermediate gear is engaged during a gearshift operation, to transmit torque of the drive motor (5) to the main transmission shaft (30) on the drive output side, while a speed of the drive motor (5) is adapted to a synchronous speed of a target gear, disengaging an original gear when the original gear is free from load, engaging the target gear when the synchronous speed has been reached, and disengaging the intermediate gear again.

16. The method according to claim 14, further comprising the step of connecting and engaging the frictional clutch (41, 41') to the first shifting clutch (42, 42') associated with the transmission input shaft (40) for a starting process, and after starting, bridging and, immediately thereafter, disengaging the frictional clutch (41, 41).

17. A multi-group transmission of a motor vehicle comprising:

at least first and second coaxial transmission groups (2, 3) having at least one common countershaft (8, 9);

a clutch mechanism (16, 16'), comprising a frictional clutch (41, 41') and first and second shifting clutches (42, 42', 43, 43'), being coupled on a first side to a drive shaft (6) of a drive motor (5) and on an opposite side to a transmission input (7);

the first shift clutch (42, 42') being shiftable between a first shift position (S1) and a second shift position (S2), and the drive shaft (6) of the drive motor (5) engaging a transmission input shaft (40) when either:

both the first shift clutch (42, 42') is in the first shift position (S1) and the frictional clutch (41, 41') is engaged, or the first shift clutch (42, 42') is in the second shift position (S2); and the drive shaft (6) of the drive motor (5) engaging a transmission main shaft (30), which is engagable with a transmission output shaft (36), when both the second shifting clutch (43, 43') and the frictional clutch (41, 41') are engaged.

* * * * *